(12) United States Patent
Khan et al.

(10) Patent No.: US 8,931,283 B2
(45) Date of Patent: Jan. 13, 2015

(54) REFORMED MULTI-FUEL PREMIXED LOW EMISSION COMBUSTOR AND RELATED METHOD

(75) Inventors: Abdul Rafey Khan, Greenville, SC (US); Hasan Karim, Simpsonville, SC (US); Jonathan Dwight Berry, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1010 days.

(21) Appl. No.: 13/010,828

(22) Filed: Jan. 21, 2011

(65) Prior Publication Data

US 2012/0186266 A1 Jul. 26, 2012

(51) Int. Cl.
| | |
|---|---|
| *F02C 6/18* | (2006.01) |
| *F02C 1/00* | (2006.01) |
| *F02C 7/22* | (2006.01) |
| *F02C 3/20* | (2006.01) |
| *F23R 3/28* | (2006.01) |
| *F02C 9/00* | (2006.01) |
| *F02C 7/00* | (2006.01) |
| *F02C 3/30* | (2006.01) |

(52) U.S. Cl.
CPC ... *F02C 3/20* (2013.01); *F02C 7/22* (2013.01); *F23R 3/28* (2013.01); *F23C 2900/03002* (2013.01); *Y02T 50/678* (2013.01)
USPC .......... 60/780; 60/39.12; 60/39.26; 60/39.27; 60/39.3; 60/39.53; 60/723; 60/737; 60/775; 60/777

(58) Field of Classification Search
USPC .............. 60/39.12, 39.26, 39.27, 39.3, 39.53, 60/723, 737, 775, 780, 783, 39.822, 777
See application file for complete search history.

(56) References Cited

U.S. PATENT DOCUMENTS

| | | | |
|---|---|---|---|
| 3,796,547 A | 3/1974 | Muenger | |
| 3,987,773 A | 10/1976 | Harrow et al. | |
| 4,201,191 A | 5/1980 | Zink et al. | |

(Continued)

FOREIGN PATENT DOCUMENTS

JP 02259331 A * 10/1990

OTHER PUBLICATIONS

"Catalytic Partial Oxidation Reforming of Hydrocarbon Fuels," by Ahmed et al, 1998 Fuel Cell. Seminar, 1998.

(Continued)

*Primary Examiner* — William H Rodriguez
*Assistant Examiner* — Arun Goyal
(74) *Attorney, Agent, or Firm* — Nixon & Vanderhye P.C.

(57) ABSTRACT

A reformer for use in a gas turbine engine specially configured to treat a supplemental fuel feed to the combustor that includes a reformer core containing a catalyst composition and an inlet flow channel for transporting the reformer fuel mixture, air and steam (either saturated or superheated) into a reformer core. An outlet flow channel transports the resulting reformate stream containing reformed and thermally cracked hydrocarbons and substantial amounts of hydrogen out of the reformer core for later combination with the main combustor feed. Because the catalytic partial oxidation reaction in the reformer is highly exothermic, the additional heat is transferred (and thermally integrated) using one or more heat exchange units for a first and/or second auxiliary gas turbine fuel stream that undergo thermal cracking and vaporization before combining with the reformate. The combined, hydrogen-enriched feed significantly improves combustor performance.

12 Claims, 8 Drawing Sheets

(56) References Cited

U.S. PATENT DOCUMENTS

| | | |
|---|---|---|
| 4,372,275 A | 2/1983 | Schmidt |
| 4,480,986 A | 11/1984 | Nelson et al. |
| 4,731,989 A * | 3/1988 | Furuya et al. ............... 60/775 |
| 5,113,478 A | 5/1992 | Nakashima et al. |
| 5,806,298 A | 9/1998 | Klosek et al. |
| 6,083,425 A | 7/2000 | Clawson et al. |
| 6,444,179 B1 | 9/2002 | Sederquist |
| 6,458,334 B1 | 10/2002 | Tamhankar et al. |
| 7,395,670 B1 * | 7/2008 | Drnevich et al. ............ 60/780 |
| 7,594,400 B2 * | 9/2009 | Szedlacsek et al. ......... 60/723 |
| 7,717,700 B2 * | 5/2010 | Carroni et al. ............... 431/7 |
| 2005/0072137 A1 | 4/2005 | Hokari et al. |
| 2007/0283701 A1 | 12/2007 | Yokota et al. |
| 2008/0115502 A1 | 5/2008 | Roby et al. |
| 2009/0031731 A1 | 2/2009 | Ziminsky et al. |

OTHER PUBLICATIONS

IEEE Transaction on Control System Technology, vol. This person is applicant for the purposes of:, No. Y. Month 2003 article entitled "Control of Natural Gas Catalytic Partial Oxidation for Hydrogen Generation in Fuel Cell Applications," by Pukrushpan et al.

* cited by examiner

FIG. 6
(Axial flow)

FIG. 7
(Axial flow)

FIG. 8
(Axial flow)

FIG. 9

REFORMED MULTI-FUEL PREMIXED LOW EMISSION COMBUSTOR AND RELATED METHOD

The present invention relates to combustion systems and, more particularly, to a combustion system for a gas turbine engine using a fuel reformer and the thermal integration of heat generated during the reforming process to produce a lower emission and more efficient hydrocarbon fuel as a supplemental feed to the gas turbine combustor.

BACKGROUND OF THE INVENTION

Gas turbine engines typically include a compressor section, a combustor section and at least one turbine that rotates in order to generate electrical power. The compressor discharge feeds directly into the combustor section where hydrocarbon fuel is injected, mixed and burned. The combustion gases are then channeled into and through one or more stages of the turbine which extracts rotational energy from the combustion gases.

In order to achieve maximum operating efficiency, gas turbine combustion systems must operate over a wide range of different fuel compositions, pressures, temperatures and fuel/air ratio conditions, preferably with the ability to use either liquid or gas fuels or a combination of both (referred to as "dual fire" systems). However, many candidate hydrocarbon fuels for use in gas turbine combustors contain unwanted contaminants and/or byproducts of other processes that tend to inhibit combustion and/or reduce the capacity and efficiency of the gas turbine system. Many candidate fuels also create environmental pollution control issues, particularly the formation of undesirable $NO_x$ components.

As a result, various prior combustor designs have attempted, with only limited success, to maintain high gas turbine engine performance levels using liquid fuel compositions while achieving acceptable emission levels, particularly the amounts of $NO_x$ and CO resulting from combustion. Most gas turbine combustors capable of achieving low $NO_x$ emissions (referred to as "dry low $NO_x$" (DLN)) require a lean, premixed combustion mixture comprising lower weight hydrocarbon fuel and an excess amount of air in order to control and limit $NO_x$ production. Typically, such combustors use a mixture of compressed natural gas consisting of 90-98% by volume methane ($CH_4$) with lesser amounts of $CO_2$, $O_2$, $N_2$ and a small fraction of short chain hydrocarbons such as ethane, ethylene, and acetylene. Those leaner mixtures tend to burn at a lower temperature than conventional diffusion flame combustors, thereby producing lower levels of pollutants, including oxides of nitrogen.

Many attempts have been made in the past to operate combustors using alternatives to natural gas, including liquid hydrocarbon fuels such as oil and diesel fuel, either alone or in combination with other gaseous fuel components. In order to generate a lean, premixed and pre-vaporized flame using liquid fuels, the fuel must first be vaporized and, if possible, reformed into more combustible and thermally efficient gases that can be mixed with air to create an acceptable fuel vapor prior to ignition in the combustor. Even then, the use of liquid fuels containing higher molecular weight hydrocarbon constituents in combination with other gas fuel elements (including lower weight aliphatic hydrocarbons) has proven to be problematic.

One recognized approach to using higher molecular weight fuels involves the process of reforming the fuels, particularly heavy oils or naphtha, into lighter hydrocarbon components. However, known reformation processes involve complex and expensive process control issues, including potential thermal efficiency losses. For example, gas turbine designs that use oil as one fuel component are vulnerable to high temperature corrosion from contaminants which cannot be readily reformed into more usable fuels. As a result, most gas turbine engines using liquid fuels run on either liquid natural gas (LNG) or very light oils that can be easily broken down into smaller hydrocarbon components and/or vaporized efficiently. Known conversion processes include catalytic steam reforming, autothermal catalytic reforming, catalytic partial oxidation and non-catalytic partial oxidation, each of which has advantages and disadvantages and produce various ratios of hydrogen and carbon monoxide ("synthesis gas").

Even though the reaction products from known catalyst systems (particularly hydrogen) are very desirable as fuel components, they can potentially cause significant damage to combustor components due to the elevated gas temperatures resulting from the catalytic reaction. That is, the reformed product temperatures often exceed the allowable threshold for materials used to form the piping for the gas turbine. Thus, in order to permit the heated reformats stream to feed directly into the combustor, high temperature fluid transfer materials are required for the downstream piping, which significantly increases system material costs. Additionally, the catalytic reformer must be cooled in some manner to prevent overheating and damage to reformer components which, even with conventional heat exchangers, adds significant complexity and expense to the system.

Given the high temperatures involved in existing reforming processes, the use of fuel reforming catalyst systems to generate additional hydrogen for use in gas turbine engines has been very limited. The known prior art catalyst systems simply do not provide an acceptable method for reforming heavier liquids and/or gas fuel components while effectively controlling and utilizing the exothermic heat of reaction generated by the reforming operation.

Thus, various thermal efficiency issues still exist with known prior art systems. For example, Muenberger U.S. Pat. No. 3,796,547 discloses a heat exchange apparatus using an exothermic catalyst housed within an enclosed cylindrical vessel with one or more heat exchangers embedded within the catalyst bed to assist in controlling the heat generated by the catalytic reaction of the feed stream, with the coolant (typically water) being introduced from an outside source and then removed from the heat exchangers. Muenberger does not contemplate or teach using the treated process stream to impart cooling to the reformed constituents or otherwise maintain a thermally integrated process.

Sederquist U.S. Pat. No. 6,444,179 describes an "autothermal" fuel cell type reformer for converting a fuel and generating free hydrogen via a catalytic reaction using superheated steam. The fuel cell reformer comprises a closed pressure vessel with first and second reactant manifolds, each consisting of a plurality of mixing tubes configured such that the heat generated from the catalytic reaction can be used to generate the superheated steam used in the reaction. Sederquist does not contemplate using the additional heat to treat the fuel source.

Clawson et al, U.S. Pat. No. 6,083,425, illustrates a conventional method for converting a hydrocarbon fuel into hydrogen and carbon dioxide within a "reformer" using an oxygen-rich gas feed and steam introduced into a partial oxidation reaction zone containing a reforming catalyst. Clawson et al do not contemplate using the treated fuel stream to impart cooling to the reformed constituents.

Hokari et al, U.S. Publication No. 2005/0472137 discloses a process for treating heavy oil by mixing the oil with "supercritical" high temperature, high pressure water and an oxidizing agent to oxide vanadium, and then separating out the resulting vanadium oxide. Again, Hokari et al do not use thermal integration of catalyst-generated heat.

Commonly-owned U.S. Pat. No. 5,113,478 describes a liquid fuel vaporizer using a heating plug disposed within a tubular body in which the liquid fuel is vaporized as a result of radiant heat from the combustion chamber and "heat-receiving" fins on the outside of the tubular member when the temperature of the combustor chamber exceeds certain threshold levels.

Thus, a significant need still exists for a reformer system capable of producing substantial quantities of free hydrogen while efficiently using the exothermic heat of reaction to treat liquid and/or "waste gas" components to render them chemically and thermally viable as supplemental fuel components.

BRIEF DESCRIPTION OF THE INVENTION

The present invention provides a new reformer design for use in a gas turbine engine configured to treat at least two and possibly three supplemental fuel feeds to a combustor to improve the chemical and physical properties of the combined combustor feed. In exemplary embodiments, the reformer includes a housing for a reformer core assembly that contains a catalytic partial oxidation process ("CPOX") catalyst composition and plurality of either radial or axial flow passages. The reformer also includes an inlet flow channel for transporting a first fuel mixture, air and possibly steam (preferably superheated) into the reformer core. An outlet flow channel transports the resulting reformats product stream containing reformed and thermally cracked hydrocarbons, along with substantial amounts of free hydrogen produced by the reformer core.

Because the CPOX reaction is highly exothermic, the additional heat generated by the reformer can be transferred via one or more heat exchange units to either a first or second auxiliary gas turbine fuel stream (containing gases and/or liquid fuels) that undergo thermal cracking and vaporization before one or both additional streams combine with the original reformate containing hydrogen. The combined streams are then fed to the gas turbine engine combustor to improve its performance and lower unwanted emissions. One exemplary embodiment includes one or more atomizers to treat the first auxiliary fuel stream, as well a cooling substation for the fuel feed upstream of the atomizers. The invention also encompasses a complete gas turbine engine system (including a combustor) capable of using the hydrogen-enriched and reformed fuel, as well as a related method for reforming one or more hydrocarbon fuel streams using the new reformer design to improve the overall gas turbine engine performance.

DETAILED DESCRIPTION OF THE INVENTION

The present invention provides a new fuel reformer design for use in a gas turbine engine in which the reformer achieves thermal integration of heat generated during the catalytic reforming step while at the same time improving the quality of the fuel stream being reformed and thereafter combined with the main fuel feed to the combustor. The reformer is capable of producing a fully vaporized fuel or, in the alternative, a fuel component for use in a dual fire combustor using a combined (and reformed) liquid and gas feed.

It has now been found that the efficiency of a combustor using liquid and/or gas fuels, either alone or in combination, can be significantly improved using CPOX in the manner described herein to increase the amount of free hydrogen present in the air/fuel mixture supplied to the combustor, which in turn tends to increase combustion stability and turn-down while lowering the level of unwanted emissions.

In one exemplary embodiment, the invention utilizes a catalytic partial oxidation process (CPOX) to reform a portion of the fuel being fed to the combustor of a gas turbine engine. Because the CPOX reaction is highly exothermic in nature, the hydrocarbon fuel source and oxygen-containing gas, such as air, are combined and contacted with the catalyst at elevated temperatures to produce a reaction product containing high concentrations of hydrogen and reformed (cracked) hydrocarbon components. Thus, the reformer converts an auxiliary air and fuel mixture (typically comprising natural gas and heavier hydrocarbon gas components) into a hydrogen-rich supplemental fuel by contacting the auxiliary fuel mixture with a catalyst, resulting in an exothermic reaction that generates free hydrogen and/or a Syngas-like reaction product (typically rich in hydrogen with additional carbon dioxide and unreacted free nitrogen). The production of free hydrogen and/or a Syngas-like product serves to improve combustor and turbine efficiency due to the thermal and environmental benefits inherent in using hydrogen and lower chain aliphatic hydrocarbons as fuel sources.

Unlike known prior art systems, including those identified above, the heat generated during the reformation step is used to vaporize (and potentially crack) one or more separate liquid "waste" fuel feeds comprised primarily of heavier oils or alternatively, higher molecular weight fuel gases containing residual amounts of heavier hydrocarbon components, such as longer chain aliphatic compounds. The resulting combined auxiliary fuel source improves overall combustor operation by creating more "lean" operating conditions in the final combustor fuel than otherwise would be possible. Notably, the reformer fuels treated in accordance with the invention include almost any hydrocarbon gas fuel, including mixtures of hydrocarbon liquid fuels, such as diesel fuels, gasoline and higher average molecular weight oils.

In addition, the reaction products of the reformer catalyst are discharged at a much higher temperature due to the exothermic reaction using a CPOX catalyst. The additional heat generated during the reaction is then used to achieve thermal integration of the entire reformer system by heating (and preferably vaporizing and/or cracking) higher molecular weight hydrocarbon components within the separate "waste" liquid and/or gas feed streams. The catalyst reformation reaction also results in significant hydrogen enrichment of the combustor feed once the products of reformation are combined with the main fuel source.

In exemplary embodiments of the invention, approximately 80-90% of fuel being fed to the combustor consists of a primary fuel source, typically a gaseous fuel/air mixture. The remaining 10-20% comprises three additional fuel streams directly involved in the reforming operation, namely a first reformed fuel stream treated with the catalyst (producing free hydrogen and lower chain aliphatic compounds), and two auxiliary fuel streams that include one or more liquid "waste" fuel constituents, including possibly heavier oils. Both of the auxiliary fuel streams undergo physical and chemical changes (including some thermal cracking of heavier components) while serving as a cooling medium for the reformate.

In effect, the exothermic heat generated during reformation serves to vaporize and/or thermally crack the heavier components in the gas and liquid fuels in both streams. The second auxiliary fuel stream can even serve as an optional cooling medium for the high temperature reaction products leaving the reformer. All three fuel streams (the main reformed fuel and first and second auxiliary fuel streams) join together to form a final combustor feed that is significantly richer in hydrogen and lower aliphatic compounds.

The present invention thus provides an improved gas reformer design and related method for cooling, i.e., thermally integrating, the high temperature reaction product stream produced by the reformer. Unlike prior art systems, the cooled reformer utilizes a portion of a less desirable fuel stream to cool the reactor assembly, including the pressure vessel housing for the reformer. That is, portions of the stream are directed over, around and adjacent to the reactor assembly to cool the reactor components, thereby preventing damage to the fuel reformer and downstream piping due to overheating. One advantage of the invention therefore involves using supplemental "waste" type fuels to cool the heated reformats produced by the reactor to an acceptable level such that the combined fuel/reformats mixture can be transported downstream using lower cost, lower temperature piping materials.

In addition, at the combustor end the increased hydrogen levels improve flame stability during low $NO_x$ operation, resulting in lower emissions and increased turndown. The in-line fuel reformer design also permits the fuel reactivity to be accurately monitored and controlled, leading to greater fuel flexibility and efficiency.

In an optional embodiment, steam (either saturated or superheated depending on the reformer fuel feed composition) is fed directly into the reformer to facilitate the catalytic reaction. Steam can also be included as a separate feed to the reactor assembly downstream of the reformer in order to provide additional temperature control of the reformate. In another embodiment, a diluent stream, such as nitrogen or carbon dioxide, is directed into or around the reformer as supplemental cooling for the reactor assembly and reformate stream.

Figure 1:
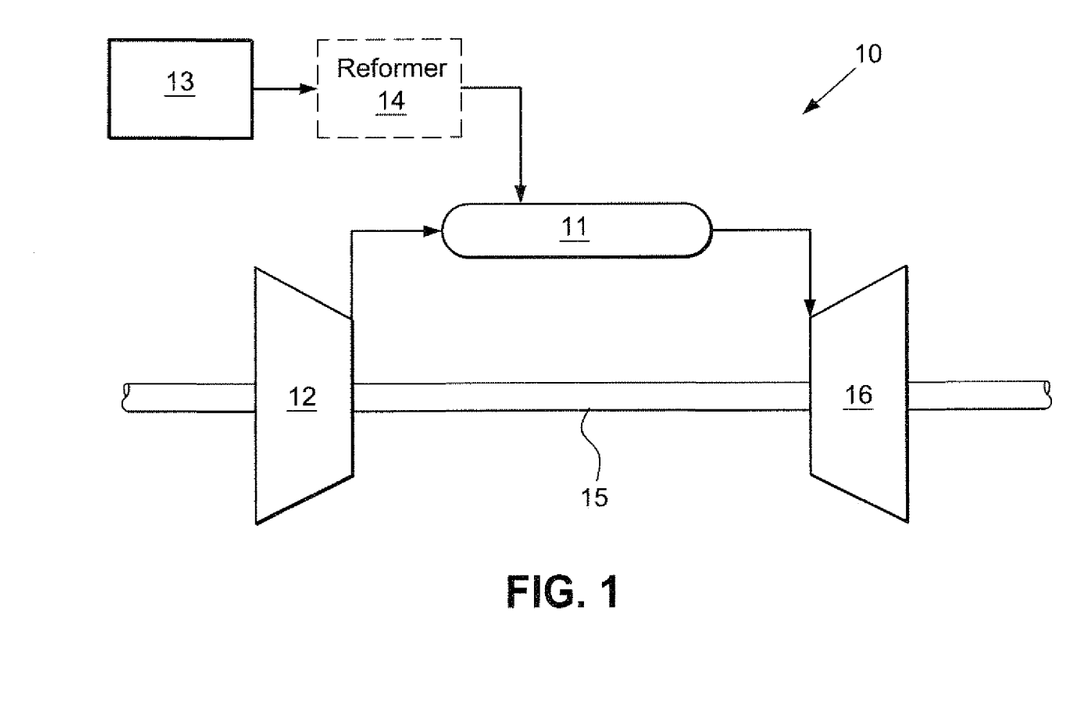
FIG. 1 is a schematic diagram of an exemplary gas turbine engine of the type useful in employing the present invention.

Turning to the figures, FIG. 1 is a schematic flow diagram of an exemplary gas turbine engine incorporating the reforming method and apparatus according to the invention. Gas turbine engine 10 includes a compressor 12, a plurality of combustors forming a combustor 11 and gas turbine 16. The compressor 12 and gas turbine 16 are coupled together by rotating shaft 15 (which can include a single shaft or a plurality of shaft segments). During operation, compressor 12 supplies compressed air to the combustor 11 while a main fuel source 13 provides the primary fuel stream to combustor 11. The air and fuel are mixed and burned, with the hot gases of combustion flowing directly from combustor 11 into the gas turbine 16 where energy is extracted from the combustion gases to produce work.

In accordance with a first embodiment of the invention, the reformer (shown in dotted line configuration at 14) is positioned upstream of the combustor 11. As noted, a primary objective of the reformer is to create a hydrogen-rich feed stream to the combustor (thereby improving the overall quality and efficiency of the combined fuel fed to the combustor and reduce unwanted emissions), while employing thermal integration to treat a second auxiliary fuel stream.

Figure 2:
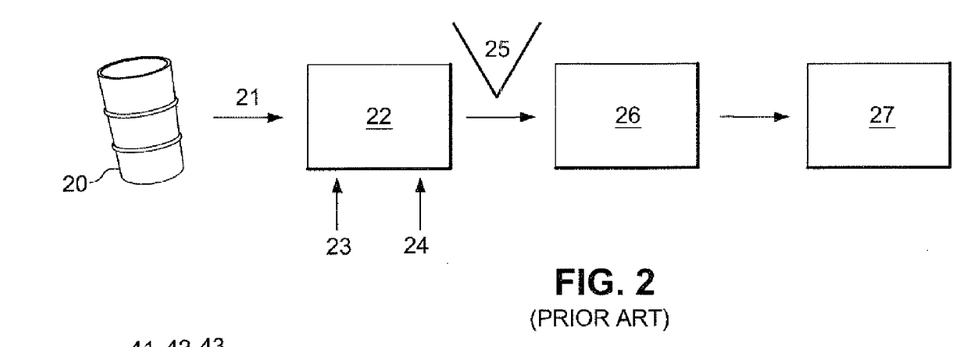
FIG. 2 is a block flow diagram depicting the basic process steps involved in briar art systems that utilize a lean, pre-vaporized, premixed combustor feed.

FIG. 2 is a block flow diagram depicting the basic process steps used in prior art systems that rely upon a premixed combustor fuel feed, but without thermal integration or modification of the basic fuel components. Typically, liquid fuel 20 is fed to one or more heat exchange units as shown at 22. The temperature of the liquid fuel is then increased using heating medium 23, preferably resulting in a vaporized fuel stream that is combined with an inert gas carrier stream 24. An additional lean, premixed, pre-vaporized fuel gas 25 is added to the already vaporized mixture and the resulting combined fuel mixture is fed into a conventional combustion device 26, resulting in a relatively "clean" burn and combustion byproducts 27.

The prior art process depicted in FIG. 2, particularly the use of a lean pre-vaporized, pre-mixed gas feed ("LPP"), cannot achieve two significant aspects of the invention, namely (1) the conversion of heavier gas fuel components to free hydrogen or (2) the use of the exothermic heat generated during the reaction to pre-treat supplemental liquid fuel components, including so-called "waste" fuels having lower heat values. Instead, a significant amount of additional heat from an outside source must be added in order to vaporize the liquid components in FIG. 1 systems. The prior art shown in the figure also typically requires using an inert gas as a separate carrier fluid, a function achieved by the invention using the reformer feed itself.

Figure 3:
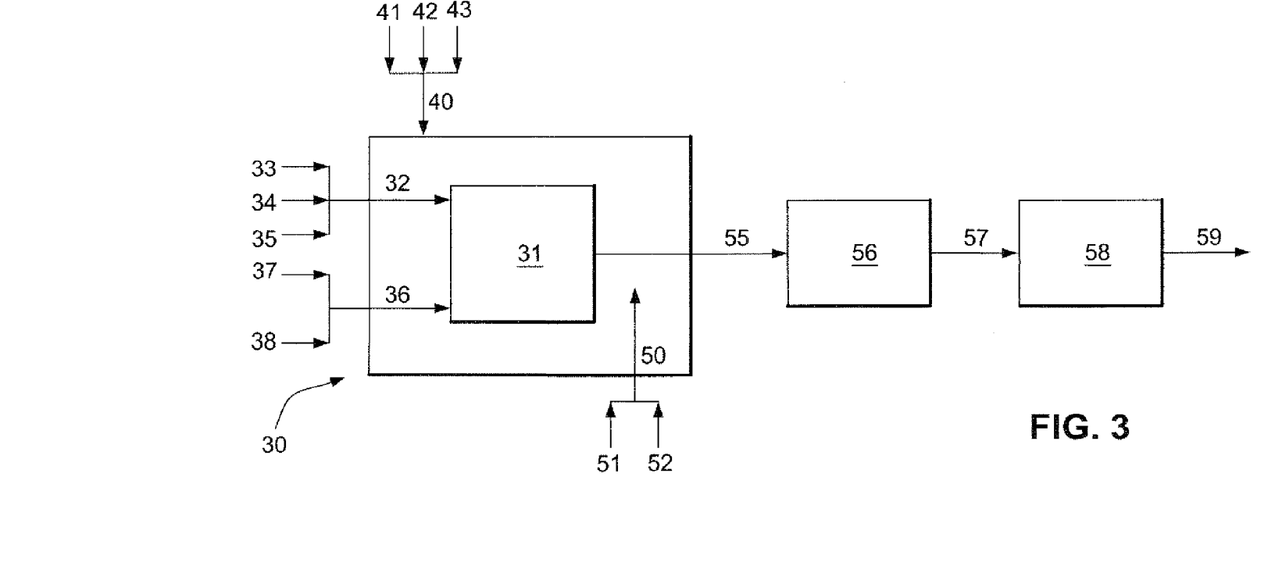
FIG. 3 is a schematic diagram of an exemplary embodiment (depicting the major pieces of equipment) for a process for reforming a premixed, multi-fuel feed to a combustor of a gas turbine engine in accordance with a first embodiment of the invention.

FIG. 3 is a schematic flow diagram depicting the major process steps and pieces of equipment for an exemplary process (shown generally as 30) for reforming a premixed, multi-fuel feed to a combustor of a gas turbine engine in accordance with a first embodiment of the invention. Reformer 31 (which preferably is capable of treating either gas, liquid or a combination of liquid/gas fuel feeds) is positioned upstream of the combustor section identified at 58, i.e., upstream of a fuel manifold (not shown) in order to reform at least a portion of the main combustor fuel to produce a hydrogen-rich reformate.

As FIG. 3 illustrates, the fuel being fed to reformer 31 optionally comprises one or more hydrocarbon gases 33, either alone or in combination with an optional liquid fuel feed 34, i.e., a liquid fuel nominally comprising higher average molecular weight fuel components. The reformer feed also includes an optional steam feed 35, either saturated or superheated in nature, depending on the chemical constituents in the auxiliary fuel source being reformed. The use of steam in certain instances helps to modify the resulting synthesis gas product and adjust the ratio of hydrogen to carbon monoxide produced by the reformer.

The primary fuel being fed to the reformer also includes ambient air 37 (serving as a carrier fluid), along with a second optional steam feed 38 (again either saturated or superheated) which serves to promote the reformation reaction of selected fuel components fed to the reformer core. The two mixed feed streams are depicted in FIG. 3 as combined reformer feeds 32 and 36. The very hot reformate end product fuel feed 55 resulting from the exothermic catalytic reaction within the reformer core includes significant quantities of free hydrogen. The additional heat content of consolidated end product fuel feed 55 can be used to treat a separate auxiliary fuel stream as described in greater detail below.

FIG. 3 shows the use of first auxiliary gas stream 40 comprising a gaseous fuel 41, along with diluent stream 42 (e.g., nitrogen or water) and a liquid fuel feed 43, typically comprising higher molecular weight hydrocarbons as compared to the primary reformer feed streams 32 and 36. This first auxiliary fuel stream 40 undergoes a heat treatment step using the exothermic heat of reaction generated in the reformer core. Nominally, the additional heat generated during the reaction will be sufficient to vaporize liquid feed 43. The additional heat generated by the reaction can thus be used to heat (and potentially crack) portions of the first auxiliary fuel stream 40 at different peripheral locations around reformer core 31.

FIG. 3 also depicts the use of an optional second auxiliary fuel stream 50 comprising additional liquid hydrocarbon fuel 51 and possibly heavier oils 52 which become part of the final feed to the combustor. Second auxiliary fuel stream 50 likewise uses a portion of the exothermic heat generated within the reformer core due to the catalytic reaction. Preferably, the exothermic heat from the reformer reaction will be sufficient to vaporize both liquid feeds 50 and 40 which then are combined into consolidated end product fuel feed 55.

The second auxiliary fuel stream 50 in FIG. 3 cools the shell side of the reformer, i.e., reducing the reformats temperature while vaporizing the liquid fuel components. Significantly, a portion of the feed from both the first and second auxiliary fuels can be "lower grade" in nature, e.g., even including blast furnace type components having a relatively low heat content. These more difficult-to-burn fuels nevertheless become useful as fuel constituents when vaporized and combined with the free hydrogen resulting from the reforming process.

In the embodiment of FIG. 3, the initial reformed feed (now enriched with additional hydrogen), together with first and second auxiliary fuel streams 40 and 50, are combined to form a consolidated combustor fuel feed. Combined and reformed vaporized fuel feed 55 passes through conventional fuel cleanup operations 56 to remove any unwanted residual heavy fuel oils. The final hydrocarbon and hydrogen enriched fuel feed 57 is then fed to combustor 58 resulting in spent (oxidized) gas emissions 59.

Figure 4:
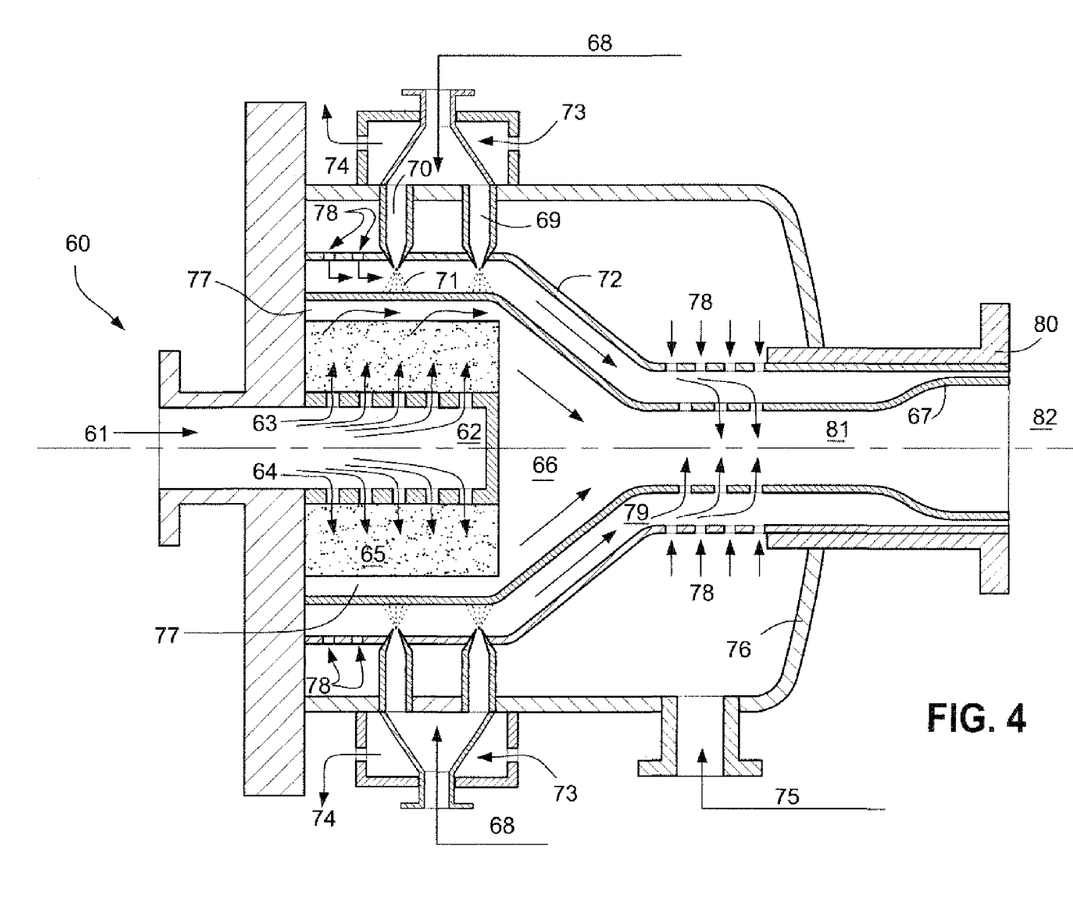
FIG. 4 is a cross-sectional side view of an exemplary embodiment of the reformer used to produce a hydrogen-rich reformed hydrocarbon feed stream to the combustor in accordance with the invention.

FIG. 4 is a cross-sectional side view of an exemplary embodiment of the reformer in accordance with the invention (shown generally as 60) as used to produce a hydrogen-rich reformed hydrocarbon feed stream to the combustor and, at the same time, thermally integrate the heat generated during reformation. As noted above, the first fuel feed 61 to the reformer can include a mixture of fuel gases (such as natural gas), as well as one or more optional liquid fuel components or inert gas streams. The gaseous feed to the reformer includes air, carbon monoxide and possibly steam (preferably superheated) which participate in the catalytic reaction (using, for example, CPOX) to produce free hydrogen and substantial amounts of heat due to the exothermic nature of the reaction. Nitrogen or other diluents can be used to control reaction rates during transient or other unstable modes of operation. The entire unreformed feed into the reformer core then flows out of the reformer core 62 through the catalyst bed as shown and out reformer discharge opening 82 into downstream equipment connected to the reformer via connection flange 80.

In operation, the reformer feed 61 passes under high pressure into the reformer core 62, and then into and through a plurality of equally-spaced radial openings in catalyst bed 65 which, in this embodiment, are depicted as being linearly spaced and surrounding reformer core 62. Taken together, reformer core 62, the plurality or fuel injection openings 63 and 64 and catalyst bed 65 define an exemplary reformer core assembly. The number and spacing of the fuel injection openings 63 and 64 in catalyst bed 65 may vary, depending on the type of catalyst employed, as well as the flow characteristics and composition of the reformer feed. For example, a series of linearly spaced openings at various radial positions around the hub of the reformer core could be used in order to ensure that the flow into and through the catalyst bed remains uniform and has an acceptable pressure drop through the catalyst bed. The resulting reformed products of the catalytic reaction (including substantial qualities of free hydrogen) exit catalyst bed 65 surrounding the reformer core and flow into reformats channel 77 and on to a reformed product collection zone defining an outlet flow channel 66 immediately downstream of the reformer core.

The combined reformed fuel containing hydrogen and vaporized fuel, as well as a thermally treated second fuel stream 79 (described below) combine as shown by the flow direction arrows in FIG. 4 to create a combined reformed vaporized fuel mixture passing into reformate flow channel 81 and then into an expanded flow channel defined by flared throat 67. The combined fuel stream at the exit of the reformer 82 connects directly to the main combustor feed via connection flange 80. As described above in connection with FIG. 3, this combined flow may undergo a second heat exchange operation to further cool the combined gas feed before reaching the combustor.

FIG. 4 also shows an exemplary embodiment of a plurality of atomizer stations, illustrated by pressure atomizers 69 and 70, that atomize (vaporize) a first auxiliary gas turbine fuel feed 68 to the system. As noted above, the resulting atomized stream at 71 utilizes the exothermic heat generated during catalytic reformation within the reformer core to vaporize liquid components in the spray and thermally crack at least a portion of the higher molecular weight hydrocarbon constituents present in the atomized stream. The atomizing process also helps to prevent the formation of heavy metal deposits and fouling due to the elevated fuel temperatures in or near the reformer. The auxiliary fuel components fed to the atomizers as shown in FIG. 4 may include various gas fuels, diluents (or water) and liquid hydrocarbon fuels Under certain conditions, the auxiliary fuel components 68 may need to be cooled slightly and increased in pressure before being atomized by pressure atomizers 69 and 70. In the embodiment of FIG. 4, the cooling can be accomplished using a water jacket as shown, with cooling water inlet 73 and outlet 74. If necessary, additional carrier gases (such as nitrogen) can also be used to assist in transporting the atomized stream from auxiliary fuel transport tube 72 into the main reformed fuel mixture (see carrier gas 75 and the plurality of carrier gas inlet ports adjacent to the atomizers and further downstream as shown at 78).

FIG. 4 also shows how the $CH_4$, fuel and ambient air in the embodiment simultaneously feed into the reformer and pass radially into and through the catalyst bed 65. The heat generated by the exothermic catalytic reaction with the reformer feed causes the walls of auxiliary fuel transport tube 72 (as well as the entire annular space defined by the fuel tube) to become very hot, enabling the conductive and radiant heat from the reaction to vaporize and/or thermally crack at least some higher molecular weight hydrocarbon components in the liquid stream being atomized. Both the vaporized/cracked stream and original reformed products (including hydrogen) are then combined in the downstream portion of the reformer in reformate flow channel 81.

Alternatively, a small amount of liquid fuel can be injected directly into the hot reformer stream (rather than into the auxiliary fuel transport tube). Both injection methods can be employed with the invention, depending on the type and physical properties of liquid fuel. It has also been found that additional "residual" reforming and thermal cracking normally occurs downstream of the catalyst bed 65 within the reformate flow channel itself as a result of the now higher temperature, hydrogen-rich reformate stream.

As noted above in connection with FIG. 3, the reformer apparatus and method of FIG. 4 includes an optional separate steam feed to the reformer (either saturate or superheated, depending on the components undergoing reformation). The amount and thermal characteristics of the steam feed depends in part on the chemical constituents comprising the auxiliary fuel source being reformed. The steam also helps to control the reformation reaction with at least some partial oxidation of selected hydrocarbon compounds in the fuel stream.

Because the basic CPOX catalytic reaction taking place in the reformer is highly exothermic in nature, the heat of reaction must be controlled in order to prevent damage to the catalyst and ensure that the reaction maximizes the production of free hydrogen over time. A number of acceptable catalysts are known to achieve the desired CPOX reaction and typically comprise previous metals, such as platinum or rhodium or other noble metals placed on an adequate support structure for ease of use in a confined catalytic reaction chamber positioned between the inlet and outlet streams. As those skilled in the art will appreciate, the specific catalyst chosen for use in the reforming operation (including various CPOX catalysts) will depend in part on the exact operating conditions upstream of the combustor, feed compositions, etc.

In the apparatus and process of FIG. 4, the reformer feeds nominally consist of gas constituents or a combination of gas and liquid components, including natural gas, methane, naphtha, butane, propane, diesel, kerosene, aviation fuel, coal-derived fuel, biofuel, oxygenated hydrocarbon feedstocks, and mixtures thereof. Preferred gas components contain fewer "contaminants" (e.g., non-hydrocarbon compounds) than liquid fuels which often contain sulfur compounds or other inorganic compounds that tend to inhibit the catalytic reforming reaction. Regardless, the invention can be used in a "dual fuel" capacity, namely with both liquid and gas feeds.

The gas to be reformed can also vary considerably in composition, from very "clean" (similar in composition to natural gas and free hydrogen) to "dirty" with longer chain hydrocarbons. Preferably, the gas will be relatively low in hydrogen concentration since the presence of free hydrogen tends to reduce the overall efficiency of the reforming operation, i.e., the reformer reaction itself produces free hydrogen as the main product. It has been found that the amount of heavy oil feed to the system compared to the $CH_4$ fuel/air to be "reformed" should be about 10-20% by weight. In addition, the fuel reformer and main fuel to the combustor can consist of the same or different fuel components, thereby enabling the system to operate in a co-fire mode.

Figure 5:
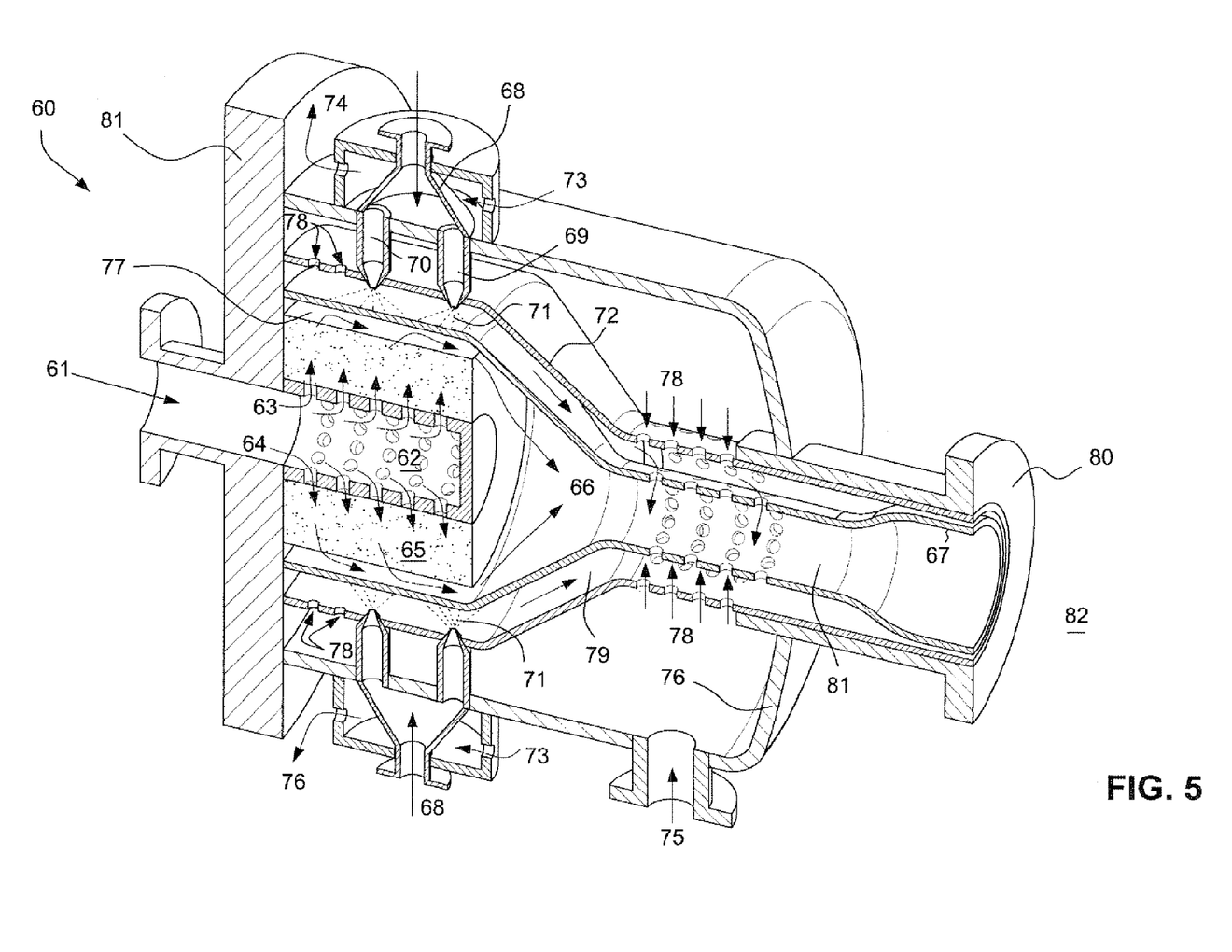
FIG. 5 is a cross-sectional side view, shown in perspective, of the exemplary reformer design depicted in FIG. 4.

FIG. 5 is a cross-sectional side view, taken in perspective, of the exemplary reformer design depicted in FIG. 4. For ease of reference, the same item numbers described above in connection with FIG. 4 are shown in connection with the FIG. 5 perspective view.

Figure 6:
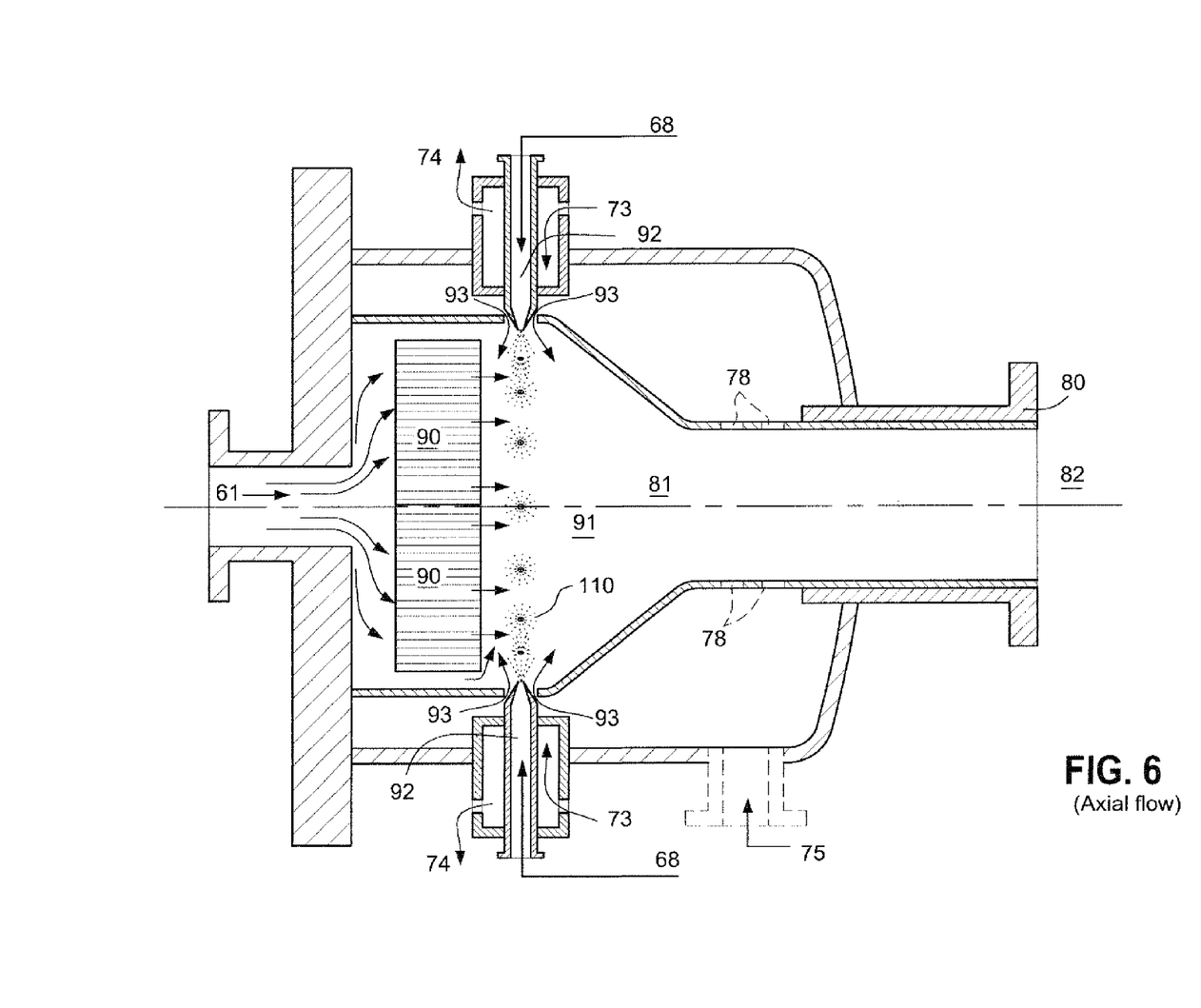
FIG. 6 is a cross-sectional side view showing an alternative embodiment of the invention with a multi-fuel feed being injected directly into and through an axially aligned CPOX catalyst bed along with one or more injection nozzles for injecting an additional gas turbine fuel component into the hot reformate stream immediately downstream of the catalyst bed.

FIGS. 6 though 9 depict alternative embodiments of the present invention, but with the auxiliary fuel being injected directly into the reformats (at a location either immediately adjacent to the CPOX catalyst bed or downstream in the main reformate channel) rather than a system that combines the gas turbine fuel with a separate carrier gas feed in the manner described above in connection with FIGS. 3, 4 and 5. FIG. 6 also depicts the fuel being injected axially into the catalyst bed and then passing through the bed and exiting as a hot reformats stream in the axial direction. For ease of reference and comparison with FIG. 4, like components in the FIG. 6 embodiment have been identified with the same numbers used in FIG. 4.

As in the embodiment of FIG. 4, the unreformed first fuel feed to the reformer, shown generally at 61 in FIG. 6, typically includes a mixture of fuel gases (such as natural gas), as well as one or more liquid fuel components. Unreformed fuel feed 61 may also include air, carbon monoxide and possibly steam (preferably superheated) which participate in the catalytic reaction (e.g., using CPOX) to produce free hydrogen and substantial amounts of heat due to the exothermic nature of the catalytic reaction. As FIG. 6 illustrates, the unreformed feed passes directly into and through catalyst bed 90 in an axial flow pattern (in contrast to the radial flow feed depicted in FIG. 4) and thus passes directly into and through the catalyst bed. The resulting reformate passes into reformed product collection zone 91 and into main reformate flow channel 81.

In operation, unreformed fuel feed 61 passes under high pressure directly into and through the plurality of equally-spaced fuel injection openings in catalyst chamber 90 which is axially aligned around the reformer core. As in the embodiment of FIG. 4, the number and spacing of the fuel injection openings in the catalyst bed may vary, depending on the type of CPOX catalyst employed and the flow characteristics and composition of the reformer feed. The resulting reformed products of the catalytic reaction (including free hydrogen) exit catalyst bed 90 into reformed product collection zone 91 and eventually into the main reformate flow channel 81.

FIG. 6 also shows the use of a plurality of atomizer stations, illustrated by pressure atomizers 92, that atomize (vaporize) second fuel feed 68 which is fed directly into the reformed product collection zone 91 via atomizers 92. As noted above, the resulting atomized stream utilizes the exothermic heat generated during the catalytic reformation to vaporize liquid components in the spray and thermally crack at least a portion of the higher molecular weight hydrocarbon constituents present in the atomized stream. The second gas turbine fuel feed 68 to the atomizers may include various gas fuels, diluents (or even water), as well as liquid hydrocarbon fuels.

The reformed products of the catalytic reaction containing hydrogen and vaporized fuel then combine as shown with atomized fuel at collection zone 91 to create a combined reformed vaporized fuel mixture that exits from the reformer at 82 directly into the main combustor feed via connection flange 80. Similar to the FIG. 4 embodiment, second fuel feed 68 may need to be cooled slightly and increased in pressure before being atomized by pressure atomizers 92. The cooling is accomplished using the water jacket as shown, with cooling water inlet 73 and outlet 74.

Although the embodiment of FIG. 6 contemplates feeding the auxiliary fuel directly into the reformer without any additional feeds, FIG. 6 also shows (in dotted line format) the potential use of at least some additional carrier gas (such as nitrogen, $CO_2$, steam, oxygen depleted EGR or additional gaseous fuel) in order to assist in transporting the atomized stream from pressure atomizer 92 into the main reformed fuel mixture through the small annular space 93 between each atomizer nozzle and the reformats channel or by way of optional carrier gas 75 and related carrier gas inlet ports 78 (shown in dotted line format). Carrier gas can also enter through small annular spaces 93.

Figure 7:
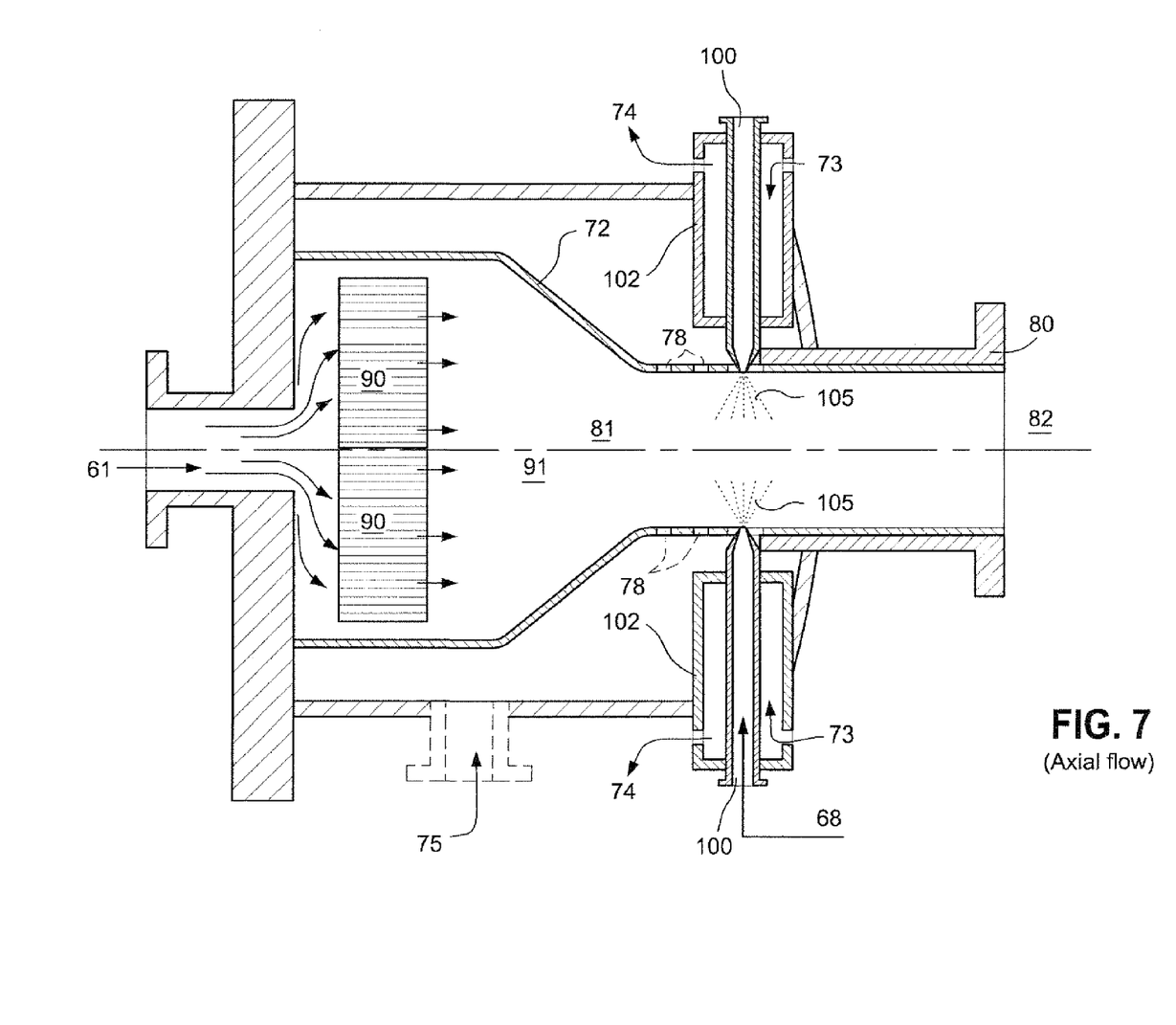
FIG. 7 is a cross-sectional side view showing a further alternative embodiment of the invention, again utilizing direct fuel injection into and through an axially aligned catalyst bed and one or more auxiliary fuel injection nozzles, but with the injection occurring further downstream of the catalyst bed into the hot reformate stream.

FIG. 7 depicts a cross-sectional side view showing a further alternative embodiment of the invention, again utilizing direct fuel injection into and through an axially aligned catalyst bed 90 using one or more fuel injection nozzles and atomizers. In contrast to the FIG. 6 embodiment, the fuel injection takes place further downstream of the CPOX catalyst bed and directly into the hot reformate stream. Again, for ease of reference, like components in the FIG. 7 embodiment have been identified with the same numbers used in FIG. 6.

In addition, as in the FIG. 6 embodiment the main unreformed fuel feed 61 to the reformer passes directly into and through catalyst bed 90 in an axial (rather than radial) flow pattern and exits the catalyst bed into reformed product collection zone 91. The reformate products then move down main reformate channel 81 and out reformer exit 82 connected to downstream combustor components via connection flange 80. In operation, the reformer feed passes under high pressure into the reformer core and directly through and into the plurality of openings in catalyst chamber 90 depicted as uniformly spaced openings axially aligned around the reformer core.

The FIG. 7 embodiment also includes a plurality of liquid fuel atomizers as shown by pressure atomizers 100 that serve to vaporize the remaining gas turbine fuel 68. The vaporized fuel feeds directly into the reformed product collection zone 91 as shown. As noted above, the exothermic heat generated during the catalytic reformation vaporizes the liquid components in the atomized stream 105 and thermally cracks at least a portion of the higher molecular weight hydrocarbon constituents present in the atomized stream. In addition, as with other embodiments discussed above, the reformate product in reformed product collection zone 91 serves as a carrier fluid having a sufficient heat value to vaporize any residual liquid fuel components as part of a combined feed to the gas turbine engine.

The combined reformed fuel containing hydrogen, additional vaporized fuel and any remaining atomized fuel then combine to form the fuel mixture exiting from the reformer directly into the main combustor feed. Similar to the FIG. 6 embodiment, the additional (auxiliary) gas turbine fuel 68 may need to be cooled and increased in pressure before being atomized by pressure atomizers 100. Again, the cooling may be accomplished using water jacket 102 as shown, with cooling water inlet 73 and outlet 74.

Similar to the embodiment of FIG. 6, FIG. 7 also contemplates the possibility of feeding the remaining gas turbine fuel 68 directly into the reformer without requiring any additional gas feed. However, FIG. 7 also depicts (in dotted line format) the optional use of additional carrier gas 75 to assist in transporting the atomized stream into the main reformed fuel mixture through the small annular space between each nozzle and the main reformate channel 81 or by way of the optional carrier gas inlet ports (again shown in dotted line format) at 78.

Figure 8:
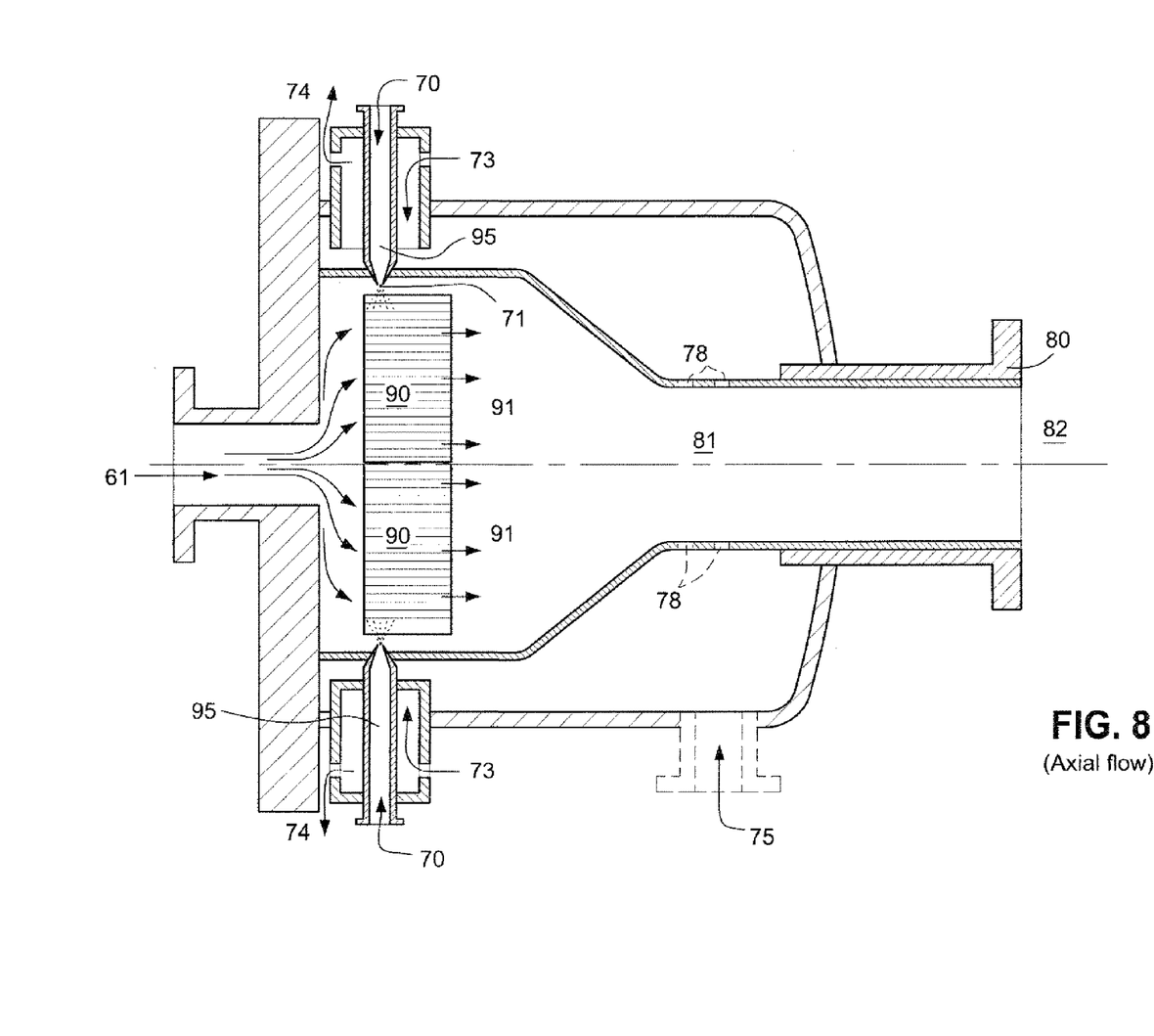
FIG. 8 is a cross-sectional side view showing yet another alternative embodiment of the invention utilizing direct fuel injection into and through an axial flow catalyst bed, with injection by one or more auxiliary fuel injection nozzles occurring immediately adjacent to the catalyst bed.

In yet another alternative embodiment, FIG. 8 is a cross-sectional side view showing the use of direct fuel injection into and through an axial flow catalyst bed 90, with the injection by one or more auxiliary fuel injection nozzles 95 occurring in close proximity to catalyst bed 90. For ease of reference, like components in the FIG. 8 embodiment have been identified with the same numbers shown in FIGS. 6 and 7. The FIG. 8 embodiment differs from FIG. 7 in one key aspect, namely the position of the injection nozzles for the additional gas turbine fuel 70 being injected into reformed product collection zone 91, i.e., immediately adjacent the catalyst bed 90 in the small annular space between the bed and the reformer wall. FIG. 8 also depicts (in dotted line format) the optional use, when necessary, of carrier gas 75 to assist in transporting the atomized stream into the main reformed fuel mixture through optional carrier gas inlet ports 78.

Figure 9:
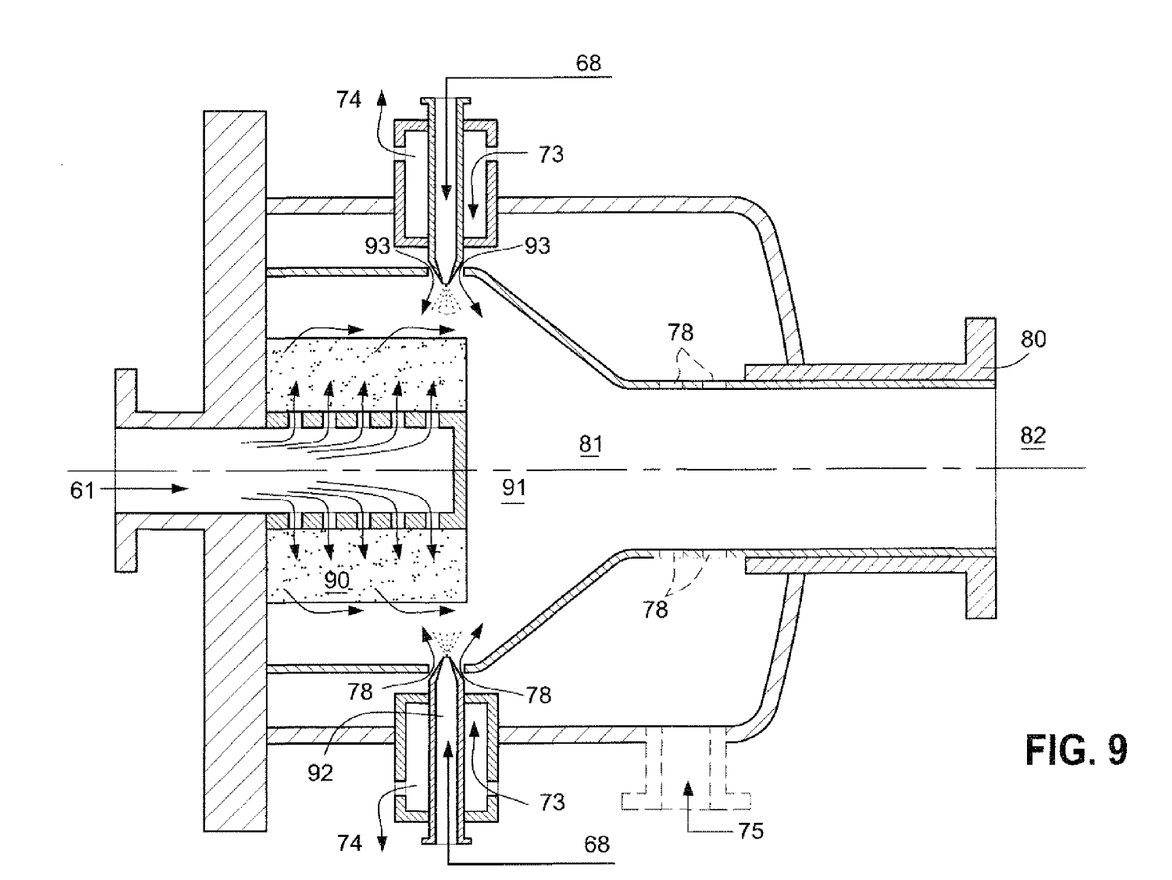
FIG. 9 is a cross-sectional side view showing a further alternative embodiment of the invention again using direct fuel injection through a radial flow (rather than axial flow) catalyst bed configuration similar to that depicted in FIG. 4, and with the auxiliary fuel injection into the hot reformate stream occurring at or near the exit of the catalyst bed.

Finally, FIG. 9 is a cross-sectional side view showing yet another alternative embodiment of the invention, this time using direct fuel injection through a radial flow catalyst bed configuration similar to that depicted in FIG. 4 and with the injection into the hot reformate stream occurring at or near the exit of catalyst bed 90. The embodiment of FIG. 9 differs from the embodiments in FIGS. 6, 7, and 8 in that it uses radial, as opposed to axial, fuel feeds into and through catalyst bed 90, again with direct injection of the remaining gas turbine fuel 68 by way one or more fuel injection nozzles 92 as shown.

All of the above figures illustrate that using a fuel reformer according to the invention, coupled with a conventional natural gas operation, will result in a significant upgrade in the final combustor fuel quality, while still achieving lower emissions of $NO_x$ and other unwanted combustion byproducts. The new method and reformer design also result in thermal integration due to the improved thermal efficiency in providing additional energy for vaporizing and/or thermally cracking fuel components using the heat exchange units described above.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A reformer for a gas turbine engine configured to treat a fuel mixture flowing to a gas turbine engine combustor, the reformer comprising:
   a reformer core assembly disposed inside said reformer and said reformer core assembly containing a catalyst and a plurality of flow passages;
   an inlet flow channel at an inlet to the reformer core assembly and configured to transport a reformer fuel mixture and oxygen-containing stream into said reformer core assembly such that the reformer fuel mixture and oxygen-containing stream enters the flow passages and interacts with the catalyst;

a reformulate channel at an outlet of the reformer core assembly and configured to receive a reformate product stream containing reformed hydrocarbons and free hydrogen discharged from said reformer core assembly, wherein the reformulate channel is within the reformer and includes an annular channel around a perimeter of the reformer core assembly;

a gas turbine fuel feed channel including an outlet coupled to the reformate channel and configured to discharge the gas turbine fuel feed into the reformate product stream flowing through the reformate channel, wherein the gas turbine fuel feed channel is separated by an annular wall around the annular channel; and the annular wall is configured as a heat exchanger sized to heat and thermally crack said gas turbine fuel feed in the annular channel of the reformulate channel using heat generated by an exothermic reaction of said reformer fuel mixture with said catalyst.

2. A reformer for a gas turbine engine according to claim 1, wherein said fuel mixture comprises one or more of a gaseous fuel, liquid hydrocarbon fuel, a diluent stream, carbon dioxide and nitrogen.

3. A reformer for a gas turbine engine according to claim 1, wherein said catalyst is capable of reforming said reformer fuel mixture through said exothermic reaction to produce free hydrogen.

4. A reformer for a gas turbine engine according to claim 1, wherein said reformate product stream serves as a carrier fluid with sufficient heat value to vaporize residual liquid fuel components as part of a combined feed to said gas turbine engine.

5. A gas turbine engine system using a hydrogen-enriched and reformed fuel, comprising:
  a compressor;
  one or more combustors connected to a rotating shaft and configured to transport hot gasses to said gas turbine engine;
  a primary fuel source for said combustors, wherein the primary fuel source provides a reformer fuel mixture;
  a fuel conduit coupling the primary fuel source to the combustors;
  a reformer including a housing having an inlet flow channel coupled to the fuel conduit to receive the reformer fuel mixture from the primary fuel source and an outlet flow channel coupled to the fuel conduit to discharge a fuel stream to said one or more combustors, said reformer further including a reformer core within the housing and including a catalyst having an inlet open to the inlet flow channel and an outlet open to the outlet flow channel;
  the inlet flow channel configured to transport the reformer fuel mixture and an oxygen-containing stream to an inlet to the reformer core;
  the outlet flow channel configured to receive from the reformer core assembly a reformate product stream containing reformed hydrocarbons and free hydrogen from said reformer core, wherein the outlet flow channel includes an annular channel around a perimeter of the reformer core;
  a gas turbine fuel feed channel having an outlet open to the outlet flow channel and configured to distributed a gas turbine fuel feed into the reformate product stream flowing through the outlet flow channel, wherein the gas turbine fuel feed channel is separated by an annular wall around the annular channel; and
  the annular wall configured as a heat exchange unit sized to transfer heat generated by said catalyst composition to said gas turbine fuel feed in the annular channel of the outlet flow channel.

6. A gas turbine engine system according to claim 5, wherein said reformer further comprises one or more additional gas turbine fuel feeds upstream of said combustor, and the one or more additional gas turbine fuel feeds receive fuel from an auxiliary gas turbine fuel feed.

7. A gas turbine engine system according to claim 6, wherein said auxiliary gas turbine fuel feed comprises one or more of a gaseous fuel, liquid hydrocarbon fuel, a diluent stream, carbon dioxide, nitrogen and water.

8. A gas turbine engine system according to claim 5, wherein said reformer further comprises heat exchanger sized to thermally crack and vaporize said gas turbine fuel feed using heat generated by the reaction of said reformer fuel mixture with said catalyst composition.

9. A gas turbine engine system according to claim 5, wherein said reformer fuel mixture comprises a gaseous fuel, liquid hydrocarbon fuel, a diluent stream, carbon dioxide, nitrogen and steam.

10. A gas turbine engine system according to claim 5, wherein said catalyst bed comprises a catalyst capable of reforming said reformer fuel mixture through an exothermic CPOX catalytic reaction and producing free hydrogen.

11. A method for reforming a hydrocarbon fuel for a gas turbine engine, comprising the steps of:
  feeding a reformer fuel comprising a mixture of hydrocarbon gases, oxygen-containing stream to a reformer core containing a catalyst;
  passing said mixture of hydrocarbon gases and oxygen-containing stream through said catalyst to generate a reformate product stream including free hydrogen and heat resulting from an exothermic reaction;
  discharging the heated reformate product stream containing said free hydrogen from said reformer core into a reformulate channel;
  feeding a gas turbine fuel into an annular channel extending around a perimeter of the reformer core, wherein an annular wall separates the annular channel from the reformer core;
  transferring a portion of the heat generated during said exothermic reaction to heat the annular wall and transferring heat from the heated annular wall to heat the gas turbine fuel flowing through the annular channel; and
  combining said reformate product stream and said heated gas turbine fuel in the reformulate channel.

12. The method according to claim 11, wherein said reformer fuel comprises a mixture of gaseous fuel, an oxygen-containing stream and steam.

* * * * *

UNITED STATES PATENT AND TRADEMARK OFFICE
CERTIFICATE OF CORRECTION

PATENT NO. : 8,931,283 B2
APPLICATION NO. : 13/010828
DATED : January 13, 2015
INVENTOR(S) : Khan et al.

Page 1 of 1

It is certified that error appears in the above-identified patent and that said Letters Patent is hereby corrected as shown below:

In the Specification

At Column 2, line 21, the term --reformats-- should read "reformate"

At Column 2, line 66, the Publication No. --2005/0472137-- should read "2005/0072137"

At Column 3, line 30, the term --reformats-- should read "reformate"

At Column 3, line 57, reads --steps involved in briar art systems that utilize a lean-- should read "steps involved in prior art systems that utilize a lean"

At Column 5, line 58, the term --reformats-- should read "reformate"

At Column 5, line 60, the term --reformats-- should read "reformate"

At Column 7, line 50, the term --reformats-- should read "reformate"

At Column 8, line 26, reads --reformer core 62, the plurality or fuel injection openings-- should read "reformer core 62, the plurality of fuel injection openings"

At Column 8, line 38, the term --reformats-- should read "reformate"

At Column 10, line 22, the term --reformats-- should read "reformate"

At Column 10, line 29, the term --reformats-- should read "reformate"

At Column 11, line 22, the term --reformats-- should read "reformate"

Signed and Sealed this
Fifth Day of May, 2015

Michelle K. Lee
*Director of the United States Patent and Trademark Office*